United States Patent
Rossin

(10) Patent No.: US 6,676,913 B2
(45) Date of Patent: *Jan. 13, 2004

(54) CATALYST COMPOSITION AND METHOD OF CONTROLLING PFC AND HFC EMISSIONS

(75) Inventor: Joseph A. Rossin, Columbus, OH (US)

(73) Assignee: Guild Associates, Inc., Dublin, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 10/103,073

(22) Filed: Mar. 21, 2002

(65) Prior Publication Data

US 2002/0150527 A1 Oct. 17, 2002

Related U.S. Application Data

(63) Continuation of application No. 09/398,177, filed on Sep. 17, 1999, now abandoned, which is a continuation-in-part of application No. 09/168,302, filed on Oct. 7, 1998, now Pat. No. 6,509,511, and a continuation-in-part of application No. 08/662,129, filed on Jun. 12, 1996, now Pat. No. 6,069,291.

(51) Int. Cl.[7] .......................... A62D 3/00; B01D 53/68; B01D 53/70

(52) U.S. Cl. ..................... 423/240 R; 423/240 S; 423/266; 423/628; 588/206; 588/248

(58) Field of Search .............. 423/240 R, 240 S, 423/628, 266; 588/206, 213, 248; 502/415, 500, 502, 503

(56) References Cited

U.S. PATENT DOCUMENTS

| | | | |
|---|---|---|---|
| 3,760,565 A | 9/1973 | Fish .................. | 55/71 |
| 3,899,444 A | 8/1975 | Stephens ............... | 252/455 |
| 3,980,584 A | 9/1976 | Dronov et al. ............ | 252/432 |
| 3,983,072 A | 9/1976 | Stephens ............... | 252/466 |
| 4,053,557 A | 10/1977 | Kageyama ............. | 423/240 |
| 4,059,683 A | 11/1977 | Lindberg et al. ......... | 423/481 |
| 4,092,403 A | 5/1978 | Rectenwald et al. ..... | 423/488 |
| 4,390,456 A | 6/1983 | Sanchez et al. .......... | 252/448 |
| 4,435,379 A | 3/1984 | Olson et al. ............ | 423/472 |
| 4,459,372 A | 7/1984 | Arena .................. | 502/351 |
| 4,587,116 A | 5/1986 | Livingston et al. ...... | 423/415 |
| 4,810,685 A | 3/1989 | Twigg et al. ............ | 502/60 |
| 4,868,150 A | 9/1989 | Spooner et al. ......... | 502/439 |
| 4,902,664 A | 2/1990 | Wan ................... | 502/300 |
| 5,151,263 A | 9/1992 | Okazaki et al. .......... | 423/659 |
| 5,176,897 A | 1/1993 | Lester ................. | 423/659 |
| 5,276,240 A | 1/1994 | Timmons et al. ........ | 585/642 |
| 5,276,249 A | 1/1994 | Greene et al. .......... | 588/206 |
| 5,283,041 A | 2/1994 | Nguyen et al. ......... | 423/240 |
| 5,290,429 A | 3/1994 | Delaney et al. ......... | 208/145 |
| 5,396,022 A | 3/1995 | Wu et al. .............. | 585/852 |
| 5,416,247 A | 5/1995 | Webster ............... | 588/206 |
| 5,430,230 A | 7/1995 | Mitsui et al. ........... | 588/206 |
| 5,457,268 A | 10/1995 | Greene et al. .......... | 588/207 |
| 5,578,283 A | 11/1996 | Chen et al. ............ | 423/240 R |
| 5,593,654 A * | 1/1997 | Decker, Jr. et al. ...... | 423/625 |
| 5,622,682 A | 4/1997 | Tom .................. | 423/230 |
| 5,653,949 A | 8/1997 | Chen et al. ............ | 423/240 S |
| 5,710,359 A * | 1/1998 | Lercher et al. .......... | 588/208 |
| 5,817,284 A | 10/1998 | Nakano et al. ......... | 423/240 S |
| 5,863,515 A | 1/1999 | Davis et al. ........... | 423/628 |
| 6,022,489 A | 2/2000 | Izumikawa et al. ..... | 252/182.32 |
| 6,023,007 A | 2/2000 | Nakajo et al. .......... | 588/205 |
| 6,069,291 A | 5/2000 | Rossin et al. .......... | 588/206 |
| 6,110,436 A | 8/2000 | Scholz et al. .......... | 423/240 S |
| 6,162,957 A | 12/2000 | Nakajo et al. .......... | 588/205 |
| 6,426,443 B1 * | 7/2002 | Rossin et al. .......... | 588/206 |
| 6,509,511 B1 * | 1/2003 | Rossin ................ | 588/205 |
| 2002/0150517 A1 * | 10/2002 | Mori ................. | 422/177 |

FOREIGN PATENT DOCUMENTS

| | | | |
|---|---|---|---|
| EP | 0 885 648 A1 | 12/1998 | ........ B01D/53/86 |
| GB | 2 066 690 A | 7/1981 | ........ B01J/23/74 |
| JP | 57-7254 A | 1/1982 | ........ B01J/23/40 |
| JP | 57-7255 A | 1/1982 | ........ B01J/23/60 |
| JP | 0475442 A1 | 3/1992 | ........ B01D/53/36 |
| JP | 7-80303 A * | 3/1995 | ........ B01J/23/24 |
| JP | 07080303 A | 3/1995 | ........ B01J/23/24 |
| JP | 9-57103 A2 | 4/1997 | ........ B01J/23/63 |
| JP | 9-253453 A2 | 9/1997 | ........ B01D/53/94 |
| JP | 10-66867 | 3/1998 | ........ B01J/21/16 |
| JP | 10192653 | 7/1998 | ........ B01D/53/86 |

OTHER PUBLICATIONS

Langan et al. "Strategies for greenhouse gas reduction," Solid State Technology, pp. 115–122, Jul. 1996.

Okazaki et al. "Decomposition of Chlorofluorocarbons by the Reaction with Water Vapor Catalyzed by Iron Oxide Supported on Activated Carbon" pp 1901–1904, Chemistry Letters, 1989.

Bond & Sadeghi, Catalysed Destruction of Chlorinated Hydrocarbons J. Appl. Chem. Biotechnol. 1975, pp. 241–248, Society of Chemical Industry, London.

(List continued on next page.)

*Primary Examiner*—Stanley S. Silverman
*Assistant Examiner*—Timothy C. Vanoy
(74) *Attorney, Agent, or Firm*—Baker Botts L.L.P.

(57) ABSTRACT

The present invention relates to a catalytic process for the destruction of PFC's and HFC's using a catalyst which comprises aluminum oxide that has preferably been stabilized through the addition of a stabilizing agent (such as, titanium, zirconium, or cobalt, or mixtures of these elements). The addition of these elements to the aluminum oxide unexpectedly enhances the catalyst's stability without significantly altering its reactivity. The total amount of stabilizing agent added to the catalyst can be as low as 0.005 parts (by weight) stabilizing agent per part (by weight) aluminum oxide ($Al_2O_3$) or as great as 2 or more parts (by weight) stabilizing agent per part (by weight) aluminum oxide; so long as there is sufficient aluminum oxide available to effectively catalyze the destruction of the target PFC's and/or HFC's. An oxidizing agent, such as, for example, platinum, palladium, rhodium, iridium, silver, nickel, copper, iron, vanadium, and/or cerium, may be added to the catalyst to effectively convert any carbon monoxide to carbon dioxide.

12 Claims, No Drawings

OTHER PUBLICATIONS

Burdenuic & Crabtree, Mineralization of Chlorofluorocarbons and Aromatization of Saturated Fluorocarbons by a Convenient Thermal Process, Science, 1996, pp. 340–341, Amer. Assoc. for the Advancement of Science, D.C.

Campbell & Rossin, Catalytic Oxidation of Perfluorocyclobutene over a 1%Pt/TiO$_2$ Catalyst, paper presented at 14th N. Amer. Catalysis Society Meeting, 1995 (28 pp.)

Fan & Yates, Infared Study of the Oxidation of Hexafluoropropene On TiO$_2$, J. Phys. Chem. 1994, pp. 10621–10627, Americal Chemical Society, Easton, PA.

Farris et al, Deactivation of a Pt/Al$_2$O$_3$ Catalyst During the Oxidaton of Hexafluoropropylene, Catal. Today, 1992, pp. 501–516, Elservier, Amsterdam.

Karmakar & Green, An Investigation of CFC12 (CCL$_2$F$_2$) Decomposition on TiO$_2$ Catalysts, J. Catal., 1995, pp. 394–406 Academic Press, San Diego.

Nagata et al, Catalytic Oxidative Decomposition of Chlorofluorocarbons (CFCs) in the Presence of Hydrocarbons, Applied Catalysts B: Environmental, 1994, pp. 23–31, Elsevier, Amsterdam.

PCT/US 99/21376.

Bickel et al. "Catalytic Desctruction of Chlorofluorocarbons . . . " Applied Cat. B: Environ. 4, pp. 141–153, 1994.

Copy of "Periodic Table of the Elements," Published by the Sargent–Welch Scientific Co. (Chicago, IL USA), copyright 1968.

* cited by examiner

US 6,676,913 B2

CATALYST COMPOSITION AND METHOD OF CONTROLLING PFC AND HFC EMISSIONS

STATEMENT OF RELATED CASES

This case is a continuation of U.S. patent application Ser. No. 09/398,177 filed Sep. 17, 1999, now abandoned, which is a continuation-in-part of U.S. patent application Ser. No. 09/168,302, filed Oct. 7, 1998, now U.S. Pat. No. 6,509,511, and a continuation-in-part of U.S. patent application Ser. No. 08/662,129 filed Jun. 12, 1996, now U.S. Pat. No. 6,069,291.

FIELD OF THE INVENTION

This invention relates to an aluminum oxide based catalyst compositions and a method to abate perfluorinated compounds and/or hydrofluorocarbons using the aluminum oxide based catalyst. The present invention further relates to a catalyst and a catalytic process for the conversion of volatile perfluorinated compounds (PFC's) and volatile hydrofluorocarbons (HFC's) into elemental oxides and mineral acids.

BACKGROUND OF THE INVENTION

Perfluorinated compounds (PFC's) are used extensively in the manufacture of semiconductor materials, such as for dry chemical etching and chamber cleaning processes. For the purposes of this invention, PFC's are defined as compounds composed of nitrogen, carbon, or sulfur atoms, or mixtures thereof, and fluorine atoms that do not contain double or triple bonds. Typically the compounds consist of only the carbon, nitrogen or sulfur atom(s) and the fluorine atom(s). However the PFC's may also comprise compounds containing carbon and/or nitrogen and/or sulfur plus fluorine. Examples of PFC's include nitrogentrifluoride ($NF_3$), tetrafluoromethane ($CF_4$), hexafluoroethane ($C_2F_6$), sulfurhexafluoride ($SF_6$), octafluoropropane ($C_3F_8$), decafluorobutane ($C_4F_{10}$) and octafluorocyclobutane (c-$C_4F_8$). The global warming potential of these compounds has been estimated to be many times greater than that of $CO_2$ resulting in a desire for economical technologies for achieving emissions control requirements. Hydrofluorocarbons (HFC's) are also used in the manufacture of semiconductor material, and are generated as by-products during semiconductor manufacture. HFC's are defined as compounds composed entirely of carbon, hydrogen and fluorine, and containing at least one of each element. Examples of HFC's include trifluoromethane ($CHF_3$) and 1,1,1,2-tetrafluoroethane ($C_2H_2F_4$). Like PFC's, HFC's are believed to contribute to global warming. Other applications for PFC's and HFC's include uses as polymer blowing agents and as refrigerants.

Catalytic technologies have been and continue to be widely used as an "end-of-the-pipe" means of controlling industrial emissions. This technology involves passing a contaminated stream over a catalyst in the presence of oxygen and/or water at an elevated temperature to convert the pollutants in the emissions stream to carbon dioxide, water and mineral acids, should halogens be associated with the parent compounds. This technology offers many advantages over thermal incineration as a means of controlling emissions. The principle advantages are related to the use of the catalyst, which reduces the temperature required to decompose the pollutants by several hundreds of degrees Celsius. These advantages include energy savings (which translates into lower operating costs), lower capital costs, small foot print of resulting abatement unit, a more controllable process, and no generation of thermal $NO_x$.

A primary contributor to the success of any catalytic abatement unit is the catalyst. The catalytic destruction of PFC's and HFC's results in the formation of highly corrosive fluorine-containing products, such as $F_2$, HF and/or $COF_2$. In order for a catalyst to effectively decompose these PFC's and HFC's, the catalyst must be able to maintain its integrity in the highly corrosive environment. Many typical catalytic materials will not maintain their integrity in this reaction environment due to fluorine attack.

Titania and impregnated titania catalysts (anatase phase) have been reported to decompose selected fluorine-containing compounds. Karmaker and Green, in an article entitled "An investigation of $CFCl_2$ ($CCl_2F_2$) decomposition on $TiO_2$ catalyst," *J. Catal.*, p. 394 (1995), report the use of a $TiO_2$ catalyst to destroy dichlorodifluoromethane at reaction temperatures between 200 and 400° C. in streams of humid air. Although the authors report that the catalyst is stable, a review of the data reveals the conversion of dichlorodifluoromethane to decrease from 93 to 84% over the duration of the 100 hour test. The authors also report a decrease in the surface area of the catalyst, from 170 to 40 $m^2/g$ over the duration of the experiment. The authors also present evidence that the catalyst has undergone some degree of fluorination. Based on these results, it is doubtful that the $TiO_2$ catalyst will possess the required lifetime to be considered in a commercial application. The ability of the $TiO_2$ catalyst to destroy PFC's, such as $CF_4$, $C_2F_6$, etc. was not reported in this paper. However, $TiO_2$ (anatase phase) is known to convert to the low surface area rutile phase at temperatures greater than about 450° C. (LeDuc, C. A., Campbell, J. M. and Rossin, J. A.; *"Effect of Lanthana as a Stabilizing Agent in Titanium Dioxide Support,"* Ind. Eng. Chem. Res. 35, (1996) 2473).

Fan and Yates, in an article entitled "Infrared Study of the Oxidation of Hexafluoropropene on $TiO_2$," *J. Phys. Chem.*, p. 10621 (1994), report the destruction of hexafluoropropylene ($C_3F_6$) over $TiO_2$. Although the catalyst was able to destroy hexafluoropropylene ($C_3F_6$), the loss of titanium, as $TiF_4$, was evident. The formation of $TiF_4$ would undoubtedly lead to deactivation of the catalyst and would prevent it from being employed in commercial applications.

Campbell and Rossin, in a paper entitled "Catalytic Oxidation of Perfluorocyclobutene over a Pt/$TiO_2$ Catalyst," presented at the 14th N. Am. Catal. Soc. Meeting (1995), report the use of a Pt/$TiO_2$ catalyst to destroy perfluorocyclobutene (c-$C_4F_6$) at reaction temperatures between 320 and 410° C. The authors reported some loss of reactivity over the duration of the near 100 hour reaction exposure. The authors also note the beneficial effects of water on improving the stability of the catalyst. The authors note that even at a reaction temperature of 550° C., the catalyst could not decompose perfluorocyclobutane (c-$C_4F_8$), a PFC used in the manufacture of semiconductor material. Results presented in this study demonstrate that perfluoroalkanes are significantly more difficult to destroy than the corresponding perfluoroalkene.

Aluminum oxide, particularly of the high surface area gamma phase, is widely used as a support for catalytically active metals. Aluminum oxide offers a combination of high surface area and excellent thermal stability, being able to maintain its integrity at temperatures of approximately 800° C. for short periods of time. Aluminum oxides; however, do not fare well as catalyst supports for the destruction of fluorine-containing compounds. Farris et al., in an article entitled "Deactivation of a Pt/$Al_2O_3$ Catalyst During the Oxidation of Hexafluoropropylene," *Catal. Today,* p. 501 (1992), report the destruction of hexafluoropropylene over platinum supported on a high surface area aluminum oxide catalyst. It is not reported whether the platinum or the aluminum oxide is responsible for the destruction of hexafluoropropylene. The catalyst could readily destroy hexafluoropropylene at reaction temperatures between 300 and 400° C.; however, severe deactivation of the catalyst was noted. Over the course of the experiment (less than 100 hours), the aluminum oxide was converted to aluminum trifluoride, which resulted in a severe loss of catalytic activity. This transformation of the aluminum oxide to aluminum trifluoride indicates that aluminum oxide will not be able to maintain its integrity in a fluorine environment for an extended period of operation.

Oxides of aluminum and zirconium are able to decompose PFC's and HFC's, and oxides of titanium are able to decompose HFC's. However, all these materials are rapidly deactivated during exposure to PFC's and/or HFC's and are therefore not suitable for commercial applications. Aluminum oxide is rapidly deactivated during the destruction of PFC's and HFC's due to the aluminum oxide being fluorinated, ultimately being transformed into aluminum trifluoride. Zirconium dioxide ($ZrO_2$) is rapidly deactivated during the destruction of PFC's and HFC's, with deactivation attributed to a loss in surface area brought about by insufficient thermal stability. Titanium dioxide ($TiO_2$) is reactive only in the high surface area anatase phase. $TiO_2$ does not have the necessary thermal stability to decompose many PFC's, such as $CF_4$, $SF_6$, etc. because the high surface area anatase phase $TiO_2$ is transformed to the low surface area rutile phase at temperatures greater than about 450° C. $TiO_2$ is rapidly deactivated during the destruction of HFC's, with deactivation due to a loss in surface area resulting from fluorination of the titanium.

Further, the destruction of PFC's and HFC's in the presence of moisture will generate hydrofluoric acid (HF). HF is highly corrosive and will convert many elemental oxides to the fluorine form. Fluorination of the aluminum oxide severely deactivates the catalyst by transforming the catalyst to aluminum trifluoride.

Thus there is a need in the art for a catalyst composition that is stable in the presence of corrosive elements, such as fluorine or hydrofluoric acid and abates PFC's and HFC's. The present invention provides for aluminum oxide catalysts and stabilized aluminum oxide catalysts as described herein thereby allowing for the stable operation of the catalyst for an extended period of operation to deactivate PFC's and HFC's.

BRIEF DESCRIPTION SUMMARY OF INVENTION

The present invention relates to a catalyst composition and a catalytic process for the destruction of PFC's and HFC's using a catalyst which comprises aluminum oxide that has preferably been stabilized through the addition of a stabilizing agent (such as titanium, zirconium, or cobalt, or mixtures of these elements). The addition of these elements to the aluminum oxide unexpectedly enhances the catalyst's stability without significantly altering the reactivity of the catalyst. The total amount of stabilizing agent added to the catalyst can be as low as 0.005 parts (by weight) stabilizing agent per part (by weight) aluminum oxide ($A_2O_3$) or as great as 2 or more parts (by weight) stabilizing agent per part (by weight) aluminum oxide ; so long as there is sufficient aluminum oxide available to effectively catalyze the destruction of the target PFC's and/or HFC's.

DETAILED DESCRIPTION OF INVENTION

In a preferred embodiment, the present invention relates to a catalyst composition and a catalytic process for the conversion of PFC's and HFC's into HF and $CO_2$, should carbon be associated with the parent compound (PFC's that do not contain carbon, for example, $SF_6$, will be converted into HF plus oxides of sulfur).

In a preferred embodiment, the catalyst comprises aluminum oxide, preferably aluminum oxide stabilized through combination with one or more stabilizing agents. Preferred stabilizing agents include cobalt, titanium, zirconium or compounds or mixtures thereof. Mixtures of titanium and/or zirconium and/or cobalt are preferred stabilizing agents. Mixtures of zirconium and cobalt, with optional titanium are particularly preferred. In a preferred embodiment, the total amount of stabilizing agent should be at least 0.005 parts (by weight) per part (by weight) aluminum oxide ($Al_2O_3$), preferably at least 0.05 parts by weight, preferably at least 0.15 parts by weight. In another embodiment the maximum amount of stabilizing agent employed is up to 2 parts total stabilizing agent per part aluminum oxide ($Al_2O_3$). One should note, however, that as the amount of stabilizing agent is increased, the activity of the catalyst tends to decrease, especially as the weight ratio of stabilizing agent to aluminum oxide exceeds unity. Under more severe operating conditions, such as high concentrations (greater than about 1,000 ppm) of PFC or HFC, or when dealing with streams consisting of high concentrations of mixtures of PFC's and/or HFC's, higher amounts (at least about 0.1 parts per part $Al_2O_3$) of stabilizing agents are useful to achieve stable operation of the catalyst.

In a preferred embodiment the catalyst is aluminum oxide and the stabilizing agent is a combination of zirconium (such as $ZrO_2$) plus or minus titanium (such as $TiO_2$) plus or minus cobalt. The amount of titanium (such as $TiO_2$) present can be as little as 0 and as much as 0.50 parts (by weight) per part (by weight) aluminum oxide ($Al_2O_3$), with the preferred amount (by weight) of titanium (such as $TiO_2$) being between 0.005 and 0.10 parts (by weight) per part $Al_2O_3$. The amount of zirconium (such as $ZrO_2$) present can be as little as 0.005 and as much as 1 part (by weight) per part (by weight) aluminum oxide (as $Al_2O_3$), with the preferred amount (by weight) of zirconium (such as $ZrO_2$) being between 0.03 and 0.15 parts (by weight) per part $Al_2O_3$. The amount of cobalt (as cobalt metal) in the catalyst can be as little as 0 and as much as 0.5 parts (by weight) per part (by weight) $Al_2O_3$, with the preferred amount (by weight) of cobalt being between 0.05 and 0.25 parts (by weight) per part $Al_2O_3$. Zirconium and cobalt are preferred stabilizing agents. The catalyst is very effective when both zirconium and cobalt are employed as stabilizing agents. In a particularly preferred embodiment the stabilizing agent is a mixture of $ZrO_2$ plus $TiO_2$ and cobalt metal.

The amount of stabilizing agent added to the aluminum oxide is generally determined by the conditions over which the catalyst will be operated. For example, only a small amount of stabilizing agent (0.005 to 0.03 parts by weight per part by weight aluminum oxide) will be required if the catalyst is to be operated with low concentrations (less than about 200 ppm) of PFC's and/or HFC's at low (GHSV less than about 3,600) gas hourly space velocities. Higher concentrations of stabilizing agents will be required as the as the conditions over which the catalyst will be operated become more aggressive.

The catalyst can be prepared using standard catalyst preparation techniques known to one of ordinary skill in the art. A soluble form of an aluminum oxide precursor, such as for example aluminum nitrate, boehmite, aluminum isopropoxide, sodium aluminate, aluminum triformate, aluminum trichloride, aluminum nitrate and pseudoboehmite (p-boehmite) etc. (preferably p-boehmite and/or aluminum nitrate) is slurried in a suitable solvent, such as for example water. (Aluminum nitrate and p-boehmite are the preferred aluminum sources. When desired, aluminum oxide can be used as the aluminum source. Aluminum oxide can be of several phases, such as gamma, chi, eta, theta, delta and kappa.) To the aluminum oxide precursor is added a titanium source, such as for example titanium dioxide, titanium oxysulfate, titanium tetrachloride, titanium isopropoxide, etc. and/or a zirconium source, such as for example zirconium oxynitrate, zirconium dioxide, zirconium oxychloride, zirconium isopropoxide, etc. Titanium may also be present in the p-boehmite as an impurity. Titanium oxysulfate is a preferred titanium source. Zirconium oxynitrate is a preferred form of zirconium. The slurry is then mixed, dried and calcined. If desired, the resulting material can be impregnated with cobalt using techniques well known to one skilled in the art. Alternatively, cobalt can be added to the catalyst during the preparation of the aluminum oxide slurry by adding a soluble form of cobalt to the slurry, such as for example cobalt nitrate, cobalt acetate, etc., or by adding small particles of cobalt oxide. Cobalt sources include cobalt oxide, cobalt acetate, cobalt nitrate, etc., with cobalt acetate being the preferred form.

In another embodiment the catalyst can be prepared by combining a suitable form of aluminum with soluble forms of titanium, zirconium, and/or cobalt in an aqueous or non-aqueous slurry. The slurry is then peptized through the addition of a peptizing agent (such as nitric acid) to form a gel. The gel is then dried and calcined to yield the product catalyst. If desired, the gel can be aged for an extended period of time. Whenever the catalyst contains cobalt, it is desired to calcine the catalyst at temperatures greater than about 600° C. to complex the cobalt with the aluminum oxide. This complexing will result in the formation of a cobalt aluminate complex, and will be evidenced by the material being a deep blue color, versus a black color for cobalt oxide ($Co_3O_4$). The cobalt impregnated material is then dried and calcined at a temperature sufficient to cause the cobalt to complex with the aluminum oxide or stabilized aluminum oxide. The calcining temperature is preferably at least about 600° C. and preferably between about 700 and 900° C. However, if the catalyst is being operated at temperatures greater than about 600° C., it will not be necessary to calcine the catalyst following impregnation, as this step will be performed during the reaction exposure.

Alternatively, the catalyst can be prepared by impregnating aluminum oxide (delta, gamma, chi, eta, kappa-delta, etc. phase) with soluble forms of zirconium, titanium and/or cobalt, followed by drying and calcining the resulting material as described previously.

Likewise, the catalyst can also be prepared by impregnating porous cobalt oxide with a solution containing a soluble form of aluminum, such as for example aluminum nitrate, plus, if desired, soluble forms of titanium and zirconium. Following drying and calcination at about 600° C. or greater preferably 700 to 900° C.), the resulting material would consist of aluminum oxide (plus titanium and zirconium oxides) dispersed onto a cobalt oxide support, where the aluminum oxide would exist as a cobalt aluminate.

A preferred methodology for preparing the catalyst is to combine the zirconium and/or titanium sources with the aluminum oxide precursor during the synthesis of the aluminum oxide. This procedure results in at least a portion of the stabilizing agent being incorporated into the aluminum oxide structure. It is preferred to add cobalt to the catalyst via an impregnation technique following preparation of the aluminum oxide or stabilized aluminum oxide. In a preferred embodiment cobalt is added to the catalyst via an impregnation technique following preparation of aluminum oxide stabilized with titanium, zirconium and/or cobalt.

Another preferred method of making the catalyst is to slurry pseudoboehmite in water. To the pseudoboehmite slurry is added the desired amount of zirconium oxynitrate and/or titanium oxysulfate. If needed, nitric acid is added to the slurry as a peptizing agent. Once mixed, the slurry is dried, then calcined to form the stabilized aluminum oxide. The stabilized aluminum oxide is then ground to the desired catalyst particle size.

It should be noted that the elements which comprise the catalyst should be highly dispersed throughout the particular configuration used. The degree of dispersion of the catalyst precursors can affect the stability and activity of the resulting catalyst.

For the purposes of this invention and the claims thereto, the term stabilized aluminum oxide is defined to be a composition where the aluminum oxide is present in combination with one or more stabilizing agents including: (1) the reaction product of an aluminum oxide precursor with one or more stabilizing agents, (2) one or more stabilizing agents dispersed onto an aluminum oxide support, or (3) aluminum oxide with or without one or more stabilizing agents dispersed upon a cobalt oxide support.

The catalyst may be used in any configuration or size that sufficiently exposes the catalyst to the gas stream being treated. Catalyst can be configured in many typical and well-known forms, such as for example, beads, pellets, granules, rings, spheres or cylinders. Alternatively, the catalyst may take the form of a coating on an inert carrier, such as ceramic foams, spheres or monoliths. The monolithic form may be preferred when it is desired to reduce the pressure drop through the system or minimize attrition or dusting. Alternatively, the catalyst can be extruded into a monolithic form.

In some embodiments, one may desire to add an oxidation function to the catalyst. For example, with certain PFC's and HFC's under certain operating conditions, carbon monoxide will be generated as a reaction product. The addition of an oxidizing agent to the catalyst, such as for example platinum, palladium, rhodium, iridium, silver, nickel, copper, iron, vanadium, cerium, or mixtures thereof will effectively convert any carbon monoxide to carbon dioxide. Platinum is a preferred oxidation function. The oxidizing agent can include any element or elemental oxide, or mixtures thereof, that will promote an oxidation reaction. These elements can be added to the catalyst using techniques known to one skilled in the art, for example wet impregnation.

The amount of oxidizing agent to be added to the catalyst can vary over a wide range (up to 50 weight % for example), however, this amount will generally be small, typically less than 5 weight %, preferably less than 3.5 weight %, more preferably less than about 1% of the total catalyst weight.

In an embodiment of this invention a gas stream containing one or more PFC's and/or HFC's plus water and preferably an oxidizing agent, such as oxygen (from air, for example), is contacted with the catalyst described herein at an elevated temperature. The temperature and space velocity over which the catalyst can be operated will depend on the nature of the challenge. PFC's such as $NF_3$ can be destroyed at temperatures as low as about 150° C., while PFC's such as c-$C_4F_8$ may require temperatures up to 900° C. to achieve the desired destruction efficiency. Increasing the space velocity and/or concentration of PFC or HFC in the process stream will increase the temperature required to achieve the desired destruction efficiency. Therefore, the operating conditions selected for the catalyst described herein can be varied over a wide range depending on the nature of the process stream (type and concentration of PFC and/or HFC) and the desired space velocity. The catalyst is capable of operating at temperatures from about 150° C. up to about 1000° C., typically from about 400° C. to about 900° C., more typically from about 500° C. to about 800° C. The catalyst described herein is also capable of operating at space velocities (GHSV) between 300 and 36,000 hr$^{-1}$ more preferably between 1,000 and 20,000 hr$^{-1}$, more preferably between 1,800 and 9,000 hr$^{-1}$.

The flow rates through the system should be sufficient to allow for greater than at least about 50% and preferably greater than 90% destruction of the perfluoroalkane(s) present in the stream. Under the present invention, the process involves contacting the aluminum oxide catalyst with a process stream containing PFC's and/or HFC's at temperatures between 150 and 900° C., with the preferred range between 250 and 750° C., at a gas hourly space velocity (GHSV) of between 300 and 36,000 hr$^{-1}$, with the preferred range between 1,800 and 9,000 hr$^{-1}$ in a humid environment. While not wishing to be bound by any theory, it is believed that the destruction of PFC's and HFC's proceeds according to a catalyzed hydrolysis reaction, where the decomposition of the PFC or HFC involves an interaction between itself and water adsorbed onto the surface of the catalyst. Therefore, the presence of water in the process stream is preferred. The concentration of water in the process stream should be sufficient to convert all the fluorine associated with the PFC's and/or HFC's in the process stream to HF. In cases involving HFC's where there is sufficient hydrogen associated with the parent compound to convert all the fluorine to HF (e.g. $CH_3F$), no water will be required for the reaction to proceed. It is desired; however, that excess water is present in the process stream.

The catalyst is capable of operating over a range of water concentrations, between the minimum as described above up to operating in pure steam of water vapor. If sufficient water is not present in the process stream, water can always be added, or, alternatively, water can be added indirectly through the addition of hydrocarbons, which upon decomposition will yield $CO_2$ and $H_2O$ as reaction products.

In a preferred embodiment the catalyst employed herein is believed, without wishing to be bound by any theory, to destroy PFC's and HFC's by reacting said compounds with water. Thus, in a preferred embodiment a process utilizing the catalysts described herein will contain sufficient water to bring about the chemical reaction. If there is insufficient water in the process stream, water can always be added to the process stream either directly or indirectly. Indirect water addition may be accomplished by adding hydrocarbons, alcohols, ethers, or any compound that will form water upon decomposition, to the process stream. In another preferred embodiment, it is also desired that an oxidizing agent, such as oxygen (preferably from air) be present in the process stream to minimize/eliminate carbon monoxide in favor of carbon dioxide. Water is preferably present in the process stream at least about 0.1 volume %, preferably a least 0.5 volume %, more preferably at least 3.0 volume %.

A more preferred process also has an oxidizing agent, such as oxygen (from air, for example), present in the process stream. This is because the destruction of many PFC's and HFC's will yield significant amounts of undesired carbon monoxide as a reaction product. The addition of an oxidizing agent to the feed stream will result in the conversion of any product carbon monoxide to the preferred $CO_2$. Oxygen can be added to the process stream as air.

The composition of the process stream being treated can contain up to 50,000 ppm (5 volume%) total PFC's plus HFC's, based upon the volumetric flow rate of the process stream, preferably less than 0.5 volume %, more preferably less than 0.1 volume %. However, it is preferred that the catalyst operate under conditions where the total PFC concentration of the process stream is below 5,000 ppm.

The process may also be used to treat gas streams containing, in addition to one or more PFC's and/or HFC's, other organic compounds, such as for example perfluoroalkenes, hydrofluorochlorocarbons, perfluoroethers, and hydrocarbons, such as for example alkanes, alkenes, aromatics and oxygenates. The catalyst can also be used to treat mixtures of PFC's and/or HFC's and volatile fluorine containing compounds.

The process described according to the present invention is also applicable to the injection of gaseous or liquid phase PFC's and/HFC's, or mixtures of said compounds, into a gas stream consisting of inert compounds (e.g. nitrogen) plus water, and preferably an oxidizing agent, such as air. The gas stream temperature and flow rate, and rate of PFC and/or HFC injection, are such to allow for the desired concentration of these compounds to be achieved. The resulting gas stream containing the PFC's and/or HFC's is then contacted with the catalyst described herein.

It should be noted that for cases where catalyst poisons are present in the process stream, for example, silicon tetrafluoride, the process must include a technology, such as for example dry scrubbing, water scrubbing, etc., for removing the poison from the process stream upstream of the catalyst.

It should also be noted that after the gas stream has been treated in accordance with the present invention, further treatment, if desired, may be necessary to remove hydrofluoric acid (formed during the decomposition of the PFC's and/or HFC's in the presence of an oxidizing agent plus water) from the effluent stream. If the concentration of hydrofluoric acid in the effluent stream is deemed unacceptable, conventional collection or abatement processes, such as caustic scrubbing, may be employed to avoid venting acid gases directly into the atmosphere.

In another embodiment, the silicon tetrafluoride is filtered from the process stream and/or hydrofluoric acid is filtered from the effluent stream.

The catalytic reactor used to contact the catalyst with the process stream can be of many forms and configurations, including fixed bed, fluidized bed, spinning basket, moving bed, etc. Because the catalyst is operated at an elevated temperature, it is desired that a heat recovery operation be included in the design of the process.

The compositions of the catalysts reported in the following examples of the present invention are stated in percent by weight with respect to aluminum oxide and were calculated based upon the concentration of the element in the precursor. When the metal component or components were added by wet impregnation techniques, the weight percent of the metal component(s) were calculated from the concentration of metal(s) within the impregnation solution and the amount of impregnation solution used to prepare the catalyst. When the metal component or components were added to the aluminum oxide precursor (e.g. pseudoboehmite) slurried in water, the weight percent of the metal component(s) were calculated from the amount of aluminum oxide precursor and the amount of metal(s) present within the slurry, and the weight loss upon ignition of the aluminum oxide precursor (e.g. 20–30% for pseudoboehmite) as reported by the manufacturer.

The concentration of CO, $CO_2$ and PFC's and HFC's in the reactor effluent in the following examples described herein were determined using gas chromatographic techniques employing packed columns and both thermal conductivity and flame ionization detectors. The above analytical technique is well known to one skilled in the art.

In view of the above description and the examples of the process according to the present invention which follow, it should be understood by those skilled in the art that the present invention provides a process and catalyst compositions which very effectively destroys PFC's and HFC's.

EXAMPLES

Example I

Aluminum oxide was prepared by first adding approximately 12.0 liters of deionized (DI) water to a 5 gallon vessel and stirring with a laboratory scale mixer. 3.0 kg of pseudoboehmite alumina was slowly added to the water while stirring. The pH of the slurry was then adjusted to approximately 3.3 using nitric acid, and the slurry was allowed to stir for four hours. Once complete, the slurry was covered and allowed to age for 18 hours. Following aging, the resulting gel was poured into a drying pan. The drying pan containing the gel was placed into an at 110° C. until dry. Following drying, the resulting solids were calcined by heating to 535° C. maintaining the final temperature for three hours. Approximately 2.1 kg of product $Al_2O_3$ was obtained. The resulting material was crushed and sieved to 6/12 mesh particles. The surface area of the resulting aluminum oxide was 185 $m^2/g$.

The catalyst as 6/12 mesh particles was evaluated for reactivity by placing 300 $cm^3$ (240 g) in a 2.5" i.d. stainless steel reactor. The stainless steel reactor was housed in a two-zone tube furnace. The catalyst was heated to 800° C. in humid air (3.1% $H_2O$) flowing at 9.0 Nl/min (GHSV=1,800). Once at 800° C., 1,000 ppm (v/v) of $C_2F_6$ was introduced into the process stream. This condition was maintained for one hour, at which time the catalyst temperature was decreased at a rate 60° C. Every 20 minutes (20° C. temperature intervals), the effluent stream was sampled for the concentration of CO, $CO_2$ and $C_2F_6$ using a gas chromatograph. Table 1 below reports the conversion of $C_2F_6$ as a function of reaction temperature.

TABLE 1

Conversion of $C_2F_6$ as a function of reaction temperature using catalyst of Example I.

| Temperature ° C. | Conversion of $C_2F_6$ |
|---|---|
| 800 | >99.9% |
| 780 | >99.9% |
| 760 | >99.9% |
| 740 | >99.9% |
| 720 | 99.1% |
| 700 | 96.8% |
| 680 | 91.7% |
| 660 | 81.7% |
| 640 | 68.8% |
| 620 | 52.7% |

TABLE 1-continued

Conversion of $C_2F_6$ as a function of reaction temperature using catalyst of Example I.

| Temperature ° C. | Conversion of $C_2F_6$ |
|---|---|
| 600 | 38.5% |
| 580 | 26.2% |
| 560 | 15.4% |
| 540 | 9.0% |
| 520 | 3.6% |
| 500 | 1.6% |

Example II

The catalyst prepared in Example I($Al_2O_3$) was evaluated for its ability to destroy 3,000 ppm $CHF_3$ in humid air. As described in Example I, 6/12 mesh catalyst particles were exposed to 3,000ppm $CHF_3$ in flowing humid (3.0% $H_2O$) air at a GHSV of 9,000 hr–1. Results of this test are reported in Table 2.

TABLE 2

Conversion of $CHF_3$ as a function of reaction temperature using catalyst of Example I.

| Temperature ° C. | Conversion of $CHF_3$ |
|---|---|
| 550 | >99% |
| 530 | 99% |
| 510 | 93% |
| 490 | 78% |
| 470 | 60% |
| 450 | 42% |
| 430 | 27% |
| 410 | 17% |
| 390 | 9% |
| 370 | 5% |
| 350 | 2% |

Example III

The catalyst of Example I($Al_2O_3$) was evacuated for stability by placing 100 $cm^3$ (80 g) of 6/12 mesh catalyst particles in the 2.5" i.d. reactor described in Example I. The catalyst was heated to 798° C. in humid air (2.75% $H_2O$) flowing at 9.0 Nl/min (GHSV=5,400 $hr^{-1}$). Once heated, $C_2F_6$ was introduced into the process stream at a rate sufficient to achieve a concentration of 2,000 ppm $C_2F_6$ (v/v). The effluent stream was sampled every two hours for the concentration of $C_2F_6$, CO and $CO_2$ using a gas chromatogaph. The conversion of $C_2F_6$ increased from 92 to 95% over the first 10 hours of the run, then decreased to 80% throughout the duration of the 30 hour test. Upon completion of the test, a portion of the catalyst was removed and evaluated for surface area using $N_2$ BET techniques. The surface area was determined to be 35 $m^2/g$, compared with 185 $m^2/g$ for the fresh catalyst. XPS analysis revealed a portion of the spent catalyst had been transformed into aluminum trifluoride.

The above test was repeated for a $C_2F_6$ feed concentration of 200 ppm at a reaction temperature of 755° C. and a GHSV of 5,400 $hr^{-1}$. Following 153 hours of reaction exposure, the conversion of $C_2F_6$ decreased from 95 to 88%.

The above test was repeated for a $C_2F_6$ feed concentration of 200 ppm at a reaction temperature of 645° C. and a GHSV of 1,800 hr$^{-1}$. Following 390 hours of reaction exposure, the conversion of $C_2F_6$ decreased from 93 to 85%.

The above test was repeated using $CF_4$ at a feed concentration of 200 ppm at a reaction temperature of 645° C. and a GHSV of 1,800 hr$^{-1}$. Following 400 hours of reaction exposure, the conversion of $CF_4$ remained constant at greater than 95%.

Example IV

The catalyst of Example I ($Al_2O_3$) was evaluated for stability by placing 1.35 cm$^3$ (0.9 g) of 40/60 mesh catalyst particles in a 0.375" i.d. reactor described. The catalyst was heated to 510° C. in humid air (3.0% $H_2O$) flowing at 200 Nml/min (GHSV=9,000 hr$^{-1}$). Once heated, $CHF_3$ was introduced into the process stream at a rate sufficient to achieve a concentration of 3,000 ppm $C_2F_6$ (v/v). The effluent stream was sampled every hour for the concentration of $CHF_3$, CO and $CO_2$ using a gas chromatograph. The conversion of $CHF_3$ decreased from 95% to 70% throughout the duration of the 250 hour test. XPS analysis revealed a portion of the spent catalyst had been transformed into aluminum trifluoride.

Example V

A 3% $TiO_2$—$Al_2O_3$ catalyst ($TiO_2$:$Al_2O_3$=0.03:1 by weight) was prepared by adding 2.0 L DI water to a 5 gallon vessel and stirred using a laboratory scale mixer. 0.5 kg of pseudo-boehmite alumina was slowly added to the water while stirring. The pH of the slurry was then adjusted to approximately 3.3 using nitric acid. After adjusting the pH, the 31.5 g of titanium oxysulfate was added to the slurry. The slurry was allowed to mix for three hours. Once complete, the slurry was covered and allowed to age for 18 hours. Following aging, the resulting gel was poured into a drying pan. The drying pan containing the gel was placed into an autoclave at 110° C. until dry. Following drying, the resulting solids were calcined by heating to 535° C. maintaining the final temperature for three hours. Approximately 0.36 kg of product 3% $TiO_2$—$Al_2O_3$ was obtained. The resulting material was crushed and sieved to 6/12 mesh particles. The surface area of the resulting aluminum oxide was 227 m$^2$/g.

The 3% $TiO_2$—$Al_2O_3$ catalyst as 6/12 mesh particles was evaluated for reactivity under the same condition and following the same procedure as described in Example I. Table 3 below reports the conversion of $C_2F_6$ as a function of reaction temperature.

TABLE 3

Conversion of $C_2F_6$ as a function of reaction temperature using catalyst of Example V.

| Temperature ° C. | Conversion of $C_2F_6$ |
|---|---|
| 800 | >99.9% |
| 780 | >99.9% |
| 760 | >99.9% |
| 740 | >99.9% |
| 720 | 99.0% |
| 700 | 96.5% |
| 680 | 90.8% |
| 660 | 81.3% |
| 640 | 67.5% |
| 620 | 51.7% |
| 600 | 36.3% |
| 580 | 24.1% |
| 560 | 13.8% |

TABLE 3-continued

Conversion of $C_2F_6$ as a function of reaction temperature using catalyst of Example V.

| Temperature ° C. | Conversion of $C_2F_6$ |
|---|---|
| 540 | 7.2% |
| 520 | 1.9% |
| 500 | 0.6% |

Example VI

The catalyst (3% $TiO_2$-$Al_2O_3$) was evaluated for stability by placing 100 cm$^3$ (80 g) of 6/12 mesh catalyst particles in the 2.5" i.d. reactor described in Example I. The catalyst was heated to 750° C. in humid air (3.1% $H_2O$) flowing at 9.0 Nl/min (GHSV=5,400 hr$^{-1}$). Once heated, $C_2F_6$ was introduced into the process stream at a rate sufficient to achieve a concentration of 200 ppm $C_2F_6$ (v/v) The effluent stream was sampled every two hours for the concentration of $C_2F_6$, CO and $CO_2$ using a gas chromatograph. The conversion of $C_2F_6$ remained stable at between 93 and 94% throughout the duration of the 150 hour reaction exposure. XPS analysis of the spent catalyst did not reveal the presence of aluminum trifluoride.

Example VII

A 50% $TiO_2$—$Al_2O_3$ ($TiO_2$ to $Al_2O_3$ weight ratio of 0.5 to 1) was prepared by adding 2 liters of DI water to a 4 liter jar. To the water was added 150 g of pseudo-boehmite. The pH of the slurry was adjusted to 3.3 using nitric acid, and the resulting gel was mixed for one hour. To the gel was then added 157.5 g of titanium oxysulfate. The gel was allowed to stir an additional three hours, after which, the resulting gel was covered and aged for 42 hours at room temperature. Following aging, the gel was dried at 110° C., then calcined at 535° C. for 3 hours. The resulting material was crush and sieved to 6/20 mesh particles. The surface area of the resulting 50% $TiO_2$—$Al_2O_3$ was 80 m$^2$/g The 50% $TiO_2$—$Al_2O_3$ catalyst was evaluated for stability by placing 50 cm$^3$ (52 g) of 6/20 mesh catalyst particles in a 1.5" i.d. reactor similar to that described in Example I. The catalyst was heated to 758° C. in humid air (3.1% $H_2O$) flowing at 4.5 Nl/min (GHSV=5,400 hr$^{-1}$). Once heated, $C_2F_6$ was introduced into the process stream at a rate sufficient to achieve a concentration to achieve a concentration of 200 ppm $C_2F_6$ (v/v). The effluent stream was sampled every three hours for the concentration of $C_2F_6$, CO and $CO_2$ using a gas chromatograph. The conversion of $C_2F_6$ remained stable at 97% throughout the duration of the 150 hour reaction exposure.

Example VIII

A 7.5% $ZrO_2$—$Al_2O_3$ ($ZrO_2$ to $Al_2O_3$ wt ratio of 0.075 to 1) was prepared by adding 10 liters of DI water to a 5 gallon vessel. To the vessel was added 3.0 kg of pseudo-boehmite. To the slurry was added 788 g of a zirconium oxynitrate solution (20 wt % $ZrO_2$). The resulting gel was allowed to stir for four hours. Following stirring, the gel was covered and allowed to age for 48 hours. After aging, the gel was dried and calcined following the procedure described in Example I. The surface area of the resulting material was 195 m$^2$/g.

The 7.5% $ZrO_2$—$Al_2O_3$ catalyst was evaluated for stability by placing 100 cm$^3$ (82 g) of 6/12 mesh catalyst particles in a 2.5" i.d. reactor described in Example I. The catalyst was heated to 755° C. in humid air (3.2% $H_2O$) flowing at 9.0 Nl/min (GHSV=5,400 $hr^{-1}$). Once heated, $C_2F_6$ was introduced into the process stream at a rate sufficient to achieve a concentration of 200 ppm $C_2F_6$ (v/v). The effluent stream was sampled every three hours for the concentration of $C_2F_6$, CO and $CO_2$ using a gas chromatograph. The conversion of $C_2F_6$ remained stable at 95% throughout the duration of the 150 hour reaction exposure.

Example IX $ZrO_2$—$Al_2O_3$ (weight ratio $ZrO_2$ to $Al_2O_3$=1 to 1) was prepared by adding 400 ml of DI water to a 2 liter vessel. To the water was added 300 g of aluminum nitrate and 254 g of a zirconium oxynitrate solution (20% by weight $ZrO_2$). The solution was titrated to a pH of 9 using an ammonium hydroxide solution. The resulting gel was aged for three days at room temperature, then dried at 110° C. Following drying, the material was calcined at 535° C. for 3 hours. The surface area of the resulting material was 183 $m^2/g$.

The $ZrO_2$—$Al_2O_3$ catalyst described above as 6/12 mesh particles was evaluated for reactivity under the same conditions and following the same procedure as described in Example I. Table 4 below reports the conversion of $C_2F_6$ as a function of reaction temperature.

TABLE 4

Conversion of $C_2F_6$ as a function of reaction temperature using catalyst of Example IX.

| Temperature ° C. | Conversion of $C_2F_6$ |
|---|---|
| 746 | 79% |
| 726 | 54% |
| 706 | 39% |
| 686 | 27% |
| 666 | 17% |
| 646 | 7% |
| 626 | <1% |
| 606 | <1% |

Example X

A 5% $Co/Al_2O_3$ catalyst (cobalt impregnated oxide) aluminum oxide) was prepared by impregnating 6/12 mesh particles of the aluminum oxide described in Example I using incipient wetness techniques 500 g of 6/12 mesh $Al_2O_3$ was first dried at 110° C. The cobalt impregnation solution was prepared by dissolving 105 g of cobalt acetate in a solution consisting of 142 ml of DI water and 65 g of triethanolamine. Once dissolved, the entire solution was sprayed onto the dried $Al_2O_3$ particles. The volume of this solution was sufficient to achieve incipient wetness. Once impregnated, the resulting material was dried at 55° C., then calcined at 500° C. for two hours. The resulting material was black, indicative of cobalt oxide. Further calcining the material 700° C. for two hours air changed in the flowing air change the color of the material to deep blue. The resulting material was 5% cobalt by weight.

The 5% $Co/Al_2O_3$ catalyst was evaluated for stability by placing 100 $cm^3$ (81 g) of 6/12 mesh catalyst particles in a 2.5" i.d. reactor described in Example I. The catalyst was heated to 755° C. in humid air (3.1% $H_2O$)flowing at 9.0 Nl/min (GHSV=5,400 $hr^{-1}$). Once heated, $C_2F_6$ was introduced into the process stream at a rate sufficient to achieve a concentration of 500 ppm $C_2F_6$ (v/v). The effluent stream was sampled every three hours for the concentration of $C_2F_6$, CO and $CO_2$ using a gas chromatograph. The conversion of $C_2F_6$ remained stable at 94% throughout the duration of the 267 hour reaction exposure.

Example XI

A 7.5% $ZrO_2$—$Al_2O_3$ catalyst was prepared according to the procedure described in Example VIII. The material was crushed and sieved to 6/12 mesh, then impregnated to 10% by weight cobalt by performing the procedure described in Example X twice. The resulting material is 10% Co/7.5% $ZrO_2$—$Al_2O_3$.

The 10% Co/7.5% $ZrO_2$—$Al_2O_3$ catalyst was evaluated for its ability to destroy $SF_6$, $NF_3$, $CHF_3$, $CH_3C_2F_6$, $C_3F_8$ and c-$C_4F_8$. Results of these tests are reported in Table 5 below. All tests were performed with 1,000 of the target fluorocompound in humid air. Test performed with $CH_3$employed a GHSV of 9,000 $hr^{-1}$. All other compounds were tested at a GHSV of 1,800 $hr^{-1}$.

| $NF_3$ | | $SF_6$ | | $CHF_3$ | |
|---|---|---|---|---|---|
| Temp. ° C. | Conv. | Temp. ° C. | Conv. | Temp. ° C. | Conv. |
| 392 | >99% | 597 | >99% | 475 | >99% |
| 375 | >99% | 577 | >99% | 454 | >99% |
| 358 | 98% | 557 | >99% | 435 | 97% |
| 339 | 94% | 537 | 97% | 412 | 81% |
| 321 | 78% | 517 | 87% | 389 | 53% |
| 303 | 54% | 497 | 68% | 367 | 29% |
| 286 | 32% | 477 | 43% | 345 | 13% |
| 268 | 17% | 457 | 24% | 325 | 5% |
| 252 | 8% | 437 | 12% | 305 | 2% |
| 237 | 4% | 417 | 6% | | |
| 221 | 2% | 397 | 4% | | |
| 204 | 1% | 377 | 2% | | |

| $CH_3F$ | | $CF_4$ | | $C_2F_6$ | |
|---|---|---|---|---|---|
| Temp. ° C. | Conv. | Temp. ° C. | Conv. | Temp. ° C. | Conv. |
| 249 | >99% | 699 | >99% | 750 | >99% |
| 240 | >99% | 675 | >99% | 728 | 96% |
| 230 | >99% | 654 | 98% | 706 | 92% |
| 222 | 98% | 633 | 93% | 684 | 82% |
| 213 | 95% | 612 | 84% | 662 | 69% |
| 206 | 88% | 591 | 69% | 641 | 54% |
| 199 | 78% | 570 | 50% | 620 | 38% |
| 192 | 64% | 549 | 32% | 598 | 25% |
| 185 | 50% | 528 | 20% | 577 | 16% |
| 177 | 38% | 507 | 10% | 556 | 8% |
| 163 | 21% | 486 | 5% | 535 | 4% |
| 145 | 7% | 465 | 3% | 514 | 2% |

| $C_3F_8$ | | c-$C_4F_8$ | |
|---|---|---|---|
| Temp. ° C. | Conv. | Temp. ° C. | Conv. |
| 750 | >99% | 752 | >99% |
| 730 | 96% | 731 | >99% |
| 709 | 91% | 710 | 95% |
| 688 | 80% | 689 | 78% |
| 668 | 68% | 668 | 62% |
| 647 | 53% | 647 | 41% |
| 627 | 35% | 626 | 28% |
| 607 | 24% | 605 | 18% |
| 586 | 18% | 584 | 11% |
| 566 | 10% | 563 | 7% |
| 546 | 5% | 542 | 3% |
| 525 | 2% | 521 | 1% |

Example XII

The 10% Co/7.5% $ZrO_2$—$Al_2O_3$ catalyst described in Example XI was evaluated for stability by placing 150 $cm^3$ (151 g) of 6/12 mesh catalyst particles in a 1.5" i.d. reactor similar to that described in Example I. The catalyst was heated to 625° C. in humid air (3.5% $H_2O$) flowing at 4.5 Nl/min (GHSV=1,800 $hr^{-1}$). Once heated, $SF_6$ was introduced into the process stream at a rate sufficient to achieve a concentration of 2,000 ppm $SF_6$ (v/v). The effluent stream was sampled every three hours for the concentration of $SF_6$ using a gas chromatograph. The conversion of $SF_6$ remained greater than 99% throughout the duration of the 1,000 hour reaction exposure.

The same catalyst was then exposed to 5,000 ppm $SF_6$ under the conditions described above, with the exception that the concentration of water in the process stream was increased to 4.7%, and the reaction temperature was increased to 675° C. The conversion of $SF_6$ remained stable at greater than 98% throughout the duration of the 500 hour reaction exposure.

Example XIII

The 10% Co/7.5 % $ZrO_2$—$Al_2O_3$ catalyst described in Example XI was evaluated for stability by placing 150 $cm^3$ (151 g) of 6/12 mesh catalyst particles in a 1.5" i.d. reactor similar to that described in Example I. The catalyst was heated to 375° C. in humid air (3.5% $H_2O$) flowing at 4.5 Nl/min (GHSV=1,800 $hr^{-1}$). Once heated, $NF_3$ was introduced into the process stream at a rate sufficient to achieve a concentration of 1,000 ppm $NF_3$ (v/v). The effluent stream was sampled every three hours for the concentration of $NF_3$ using a gas chromatograph. The conversion of $NF_3$ remained stable at greater than 99% throughout the duration of the 1,000 hour reaction exposure.

Example XIV

The 10% Co/7.5 % $ZrO_2$—$Al_2O_3$ catalyst described in Example XI was evaluated for stability by placing 50 $cm^3$ (50 g) of 6/12 mesh catalyst particles in a 1.5" i.d. reactor similar to that described in Example I. The catalyst was heated to 815° C. in humid air (3.5% $H_2O$) flowing at 4.5 Nl/min (GHSV =5.400 $hr^{-1}$). Once heated, $C_2F_6$ was introduced into the process stream at a rate sufficient to achieve a concentration of 2,000 ppm $C_2F_6$ (v/v). The effluent stream was sampled every three hours for the concentration of $C_2F_6$, CO and $CO_2$ using a gas chromatograph. The conversion of $C_2F_6$ remained stable at greater than 95% throughout the duration of the 1,000 hour reaction exposure.

Example XV

The 10% Co/7.5 % $ZrO_2$—$Al_2O_3$ catalyst described in Example XI was evaluated for stability by placing 50 $cm^3$ (50 g) of 6/12 mesh catalyst particles in a 1.5" i.d. reactor similar to that described in Example I. The catalyst was pretreated by heating to 750° C. in flowing, humid air overnight to pre-condition the catalyst. The catalyst was then cooled to 450° C. in humid air (3.5% $H_2O$) flowing at 7.5 Nl/min (GHSV=9,000 $hr^{-1}$). Once heated, $CHF_3$ was introduced into the process stream at a rate sufficient to achieve a concentration of 1,000 ppm $C_2F_6$ (v/v). The effluent stream was sampled every three hours for the concentration of $CHF_3$, CO and $CO_2$ using a gas chromatograph. The conversion of $CHF_3$ remained stable at greater than 98% throughout the duration of the 1,000 hour reaction exposure.

Example XVI

A 25% Co/7.5 % $ZrO_2$—$Al_2O_3$ catalyst was prepared by impregnating the 7.5% $ZrO_2$—$Al_2O$ catalyst described in Example XI with 25% cobalt by repeating the procedure described in Example X a total of 5 times. The resulting catalyst was evaluated for stability by placing 50 $cm^3$ (50 g) of 6/12 mesh catalyst particles in a 1.5" i.d. reactor similar to that described in Example I. The catalyst was heated to822° C. in humid air (3.9% $H_2O$) flowing at 4.5 Nl/min (GHSV=5,400 $hr^{-1}$). Once heated, a mixture of $C_2F_6$ and $SF_6$ was introduced into the process stream at a rate sufficient to achieve a concentration of 1,500 ppm (v/v) of each compound. The effluent stream was sampled every three hours for the concentration of $C_2F_6$, $SF_6$, CO and $CO_2$ using a gas chromatograph. The conversion of $C_2F_6$ remained stable at 91%, and the conversion of $SF_6$ remained stable at greater than 99% throughout the duration of the 400 hour reaction exposure.

Example XVII

The 7.5% $ZrO_2$—$Al_2O_3$ catalyst described in Example VIII was evaluated for stability by placing 100 $cm^3$ (82 g) of 6/12 mesh catalyst particles in a 2.5" i.d. reactor described in Example I. The catalyst was heated to 793° C. in humid air (6.0% $H_2O$) flowing at 9.0 Nl/min (GHSV=5,400 $hr^{-1}$) Once heated, $C_2F_6$ was introduced into the process stream at a rate sufficient to achieve a concentration of 2,000 ppm $C_2F_6$ (v/v). The effluent stream was sampled every three hours for the concentration of $C_2F_6$, CO and $CO_2$ using a gas chromatograph. The conversion of $C_2F_6$ remained stable at 93% throughout the duration of the 150 hour reaction exposure.

The above test was repeated with a water concentration of 0.3%. Under these conditions, the conversion of $C_2F_6$ decreased from 50% to less than 10% in less than 10 hours of reaction exposure. This test demonstrates that sufficient water is preferably present in the process stream to enhance stable operation of the catalyst.

Example XVIII

The catalyst in Example XI was evaluated for its ability to destroy $C_2F_6$ in the presence and absence of $H_2O$ and $O_2$ in the process stream. 150 $cm^3$ of 10% Co/7.5% $ZrO_2$—$Al_2O_3$ was placed in a 1.5" i.d. fixed bed reactor and heated to 750° C. in humid (3.5 % $H_2O$) $N_2$ flowing at 4.5 Nl/min (GHSV=1,800). No $O_2$ was present in the process stream. Once at reaction temperature, $C_2F_6$ was introduced to the process stream at a flow rate sufficient to provide a concentration of 1,000 ppm. The initial temperature was maintained for one hour, after which, the catalyst temperature was decreased and the concentration of $C_2F_6$, $CO_2$ and CO in the effluent stream was monitored at discrete reaction temperatures. Reaction products consisted of mixtures of CO and $CO_2$, with the relative amounts dependent on the reaction temperature.

The test described above was repeated with in dry air ([$H_2O$]<100 ppm, [$O_2$]=21 %). Results of both tests are presented below.

| [$H_2O$] = 3.5%, [$O_2$] = 0% | | [$H_2O$] < 0.05%, [$O_2$] = 21% | |
|---|---|---|---|
| Temp. | Conv. | Temp. | Conv. |
| 750 | >99% | 750 | <5% |
| 729 | 97% | 728 | <5% |
| 708 | 93% | 706 | <5% |

-continued

| [H$_2$O] = 3.5%, [O$_2$] = 0% | | [H$_2$O] < 0.05%, [O$_2$] = 21% | |
|---|---|---|---|
| Temp. | Conv. | Temp. | Conv. |
| 686 | 83% | 684 | <5% |
| 664 | 70% | 662 | <5% |
| 643 | 55% | 641 | <5% |
| 621 | 39% | 620 | <5% |
| 599 | 25% | 598 | <5% |
| 579 | 15% | 577 | <5% |
| 558 | 7% | 556 | <5% |
| 538 | 3% | 535 | <5% |
| 516 | <1% | 514 | <5% |

Example XIX

The 7.5% ZrO$_2$—Al$_2$O$_3$ catalyst described in Example VIII was evaluated for reaction product distribution placing 150 cm$^3$ (125 g) of 6/12 mesh catalyst particles in a 1.5" i.d. reactor similar to that described in Example I. The catalyst was heated to 725° C. in humid air (3.0% H$_2$O) flowing at 4.5 Nl/min (GHSV=1,800 hr$^{-1}$). Once heated, C$_2$F$_6$ was introduced into the process stream at a rate sufficient to achieve a concentration of 1,000 ppm C$_2$F$_6$ (v/v). The effluent sampled every hour for the concentration of C$_2$F$_6$, CO and CO$_2$ using a gas chromatograph. The conversion of C$_2$F$_6$ remained stable at greater than 99% throughout the duration of the 18 hour reaction exposure. The concentration of CO in the effluent stream was approximately 350 ppm, and the concentration of CO$_2$ in the effluent stream was approximately throughout the duration of the run.

The 7.5% ZrO$_2$—Al$_2$O$_3$ catalyst was impregnated to 1% Pt, with the resulting catalyst being designated as 1% Pt/7.5% ZrO$_2$—Al$_2$O$_3$. The catalyst was placed in a 1.5" i.d. reactor and tested as described above. For the 1,000 ppm C$_2$F$_6$ feed, the conversion remained stable at greater than 99% throughout the duration of the 18 hour reaction exposure. No CO was detected in the effluent stream, and the concentration of CO$_2$ in the effluent stream was approximately 2,000 ppm throughout the duration of the run.

All documents described herein are incorporated by reference herein, including any priority documents and/or testing procedures. As is apparent form the foregoing general description and the specific embodiments, while forms of the invention have been illustrated and described, various modifications can be made without departing from the spirit and scope of the invention. Accordingly it is not intended that the invention be limited thereby.

What is claimed is:

1. A process to abate perfluorinated compounds and/or hydrofluorocarbons, said process comprising contacting the perfluorinated compounds and/or the hydrofluorocarbons with water and a stabilized catalyst comprising aluminum oxide, wherein said aluminum oxide is stabilized against fluorination by a minor amount of a stabilizing agent mixture dispersed thereon, wherein the stabilizing agent mixture comprising a mixture of cobalt and zirconium.

2. The process of claim 1 wherein the stabilized aluminum oxide is the product of the combination of aluminum oxide or an aluminum oxide precursor, the aluminum oxide precursor being selected from the group consisting of aluminum nitrate, boehmite, aluminum isopropoxide, sodium aluminate, aluminum triformate, aluminum trichloride, aluminum nitrate and pseudoboebmite, with said one or more stabilizing agents.

3. The process of claim 1 wherein the perfluorinated compounds and/or the hydrofluorocarbons are contacted with the stabilized aluminum oxide at a temperature between 150° C. and 1000° C.

4. The process of claim 1 wherein the stabilizing agent mixture further comprises titanium in an amount equal or less than about 0.1 parts by weight per part by weight aluminum oxide.

5. The process of claim 4 wherein the stabilized aluminum oxide is prepared from aluminum nitrate and/or pseudoboebmite and the stabilizing agent mixture further comprises platinum in an amount equal to or less than about 1% of the total catalyst weight.

6. The process of claim 1 wherein the stabilized aluminum oxide is prepared from aluminum nitrate and/or pseudoboebmite.

7. The process of claim 1 wherein the stabilized aluminum oxide comprises gamma aluminum oxide.

8. The process of claim 1 wherein the perfluorinated compounds and/or the hydrofluorocarbons are contacted with the stabilized aluminum oxide in the presence of an oxidizing agent.

9. The process of claim 8 wherein the oxidizing agent is oxygen, an oxide of nitrogen and/or an oxide of sulfur.

10. The process of claim 1 wherein the perfluorinated compounds and/or the hydrofluorocarbons are present in a gaseous stream.

11. The process of claim 1 wherein silicon tetrafluoride is filtered from a process stream.

12. The process of claim 1 wherein hydrofluoric acid is filtered from a effluent stream.

* * * * *